(12) United States Patent
Takagi

(10) Patent No.: US 8,947,464 B2
(45) Date of Patent: Feb. 3, 2015

(54) DISPLAY CONTROL APPARATUS, DISPLAY CONTROL METHOD, AND NON-TRANSITORY COMPUTER READABLE STORAGE MEDIUM

(75) Inventor: Yousuke Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 684 days.

(21) Appl. No.: 13/009,489

(22) Filed: Jan. 19, 2011

(65) Prior Publication Data

US 2011/0187739 A1 Aug. 4, 2011

(30) Foreign Application Priority Data

Feb. 1, 2010 (JP) ................................. 2010-020743

(51) Int. Cl.
G09G 5/34 (2006.01)
G09G 5/00 (2006.01)
G06F 3/0488 (2013.01)

(52) U.S. Cl.
CPC ................ *G09G 5/00* (2013.01); *G06F 3/0488* (2013.01); *G09G 5/34* (2013.01)
USPC ....................................................... 345/672

(58) Field of Classification Search
CPC .......... G09G 5/34; G09G 5/343; G09G 5/346
USPC .................. 345/672, 682, 684, 688
See application file for complete search history.

(56) References Cited

U.S. PATENT DOCUMENTS 4,720,703 A * 1/1988 Schnarel et al. .............. 345/163
5,172,102 A * 12/1992 Iwamura et al. .............. 345/688
5,359,344 A * 10/1994 Inoue et al. ................... 345/100
6,014,140 A * 1/2000 Strand ........................... 345/684
6,674,472 B1 1/2004 Tsutsui
2008/0309644 A1* 12/2008 Arimoto ........................ 345/173
2010/0201618 A1* 8/2010 Lorente ......................... 345/157

FOREIGN PATENT DOCUMENTS

| CN | 101330556 A | 12/2008 |
|---|---|---|
| JP | 11-317930 | 11/1999 |
| JP | 2000-020215 A | 1/2000 |
| JP | 2006-067157 A | 3/2006 |
| JP | 2009-245012 A | 10/2009 |
| JP | 2010-020435 A | 1/2010 |
| WO | 2008/146784 A1 | 12/2008 |

OTHER PUBLICATIONS

Aug. 31, 2012 Chinese Office Action, which is enclosed with English Translation, that issued in Chinese Patent Application No. 201110034516.4.

* cited by examiner

*Primary Examiner* — Jeffery A Brier

(74) *Attorney, Agent, or Firm* — Cowan, Liebowitz & Latman, P.C.

(57) ABSTRACT

When changing a plurality of displayed items to a plurality of other items that are at least partially different, at least one selected item of the plurality of displayed items is identifiably displayed, and its display position is stored. After the plurality of displayed items have been changed to the plurality of other items, an item displayed at the same position as the stored display position of the selected item before the change is identifiably displayed. This improves the operability when simultaneously displaying a plurality of items.

14 Claims, 6 Drawing Sheets

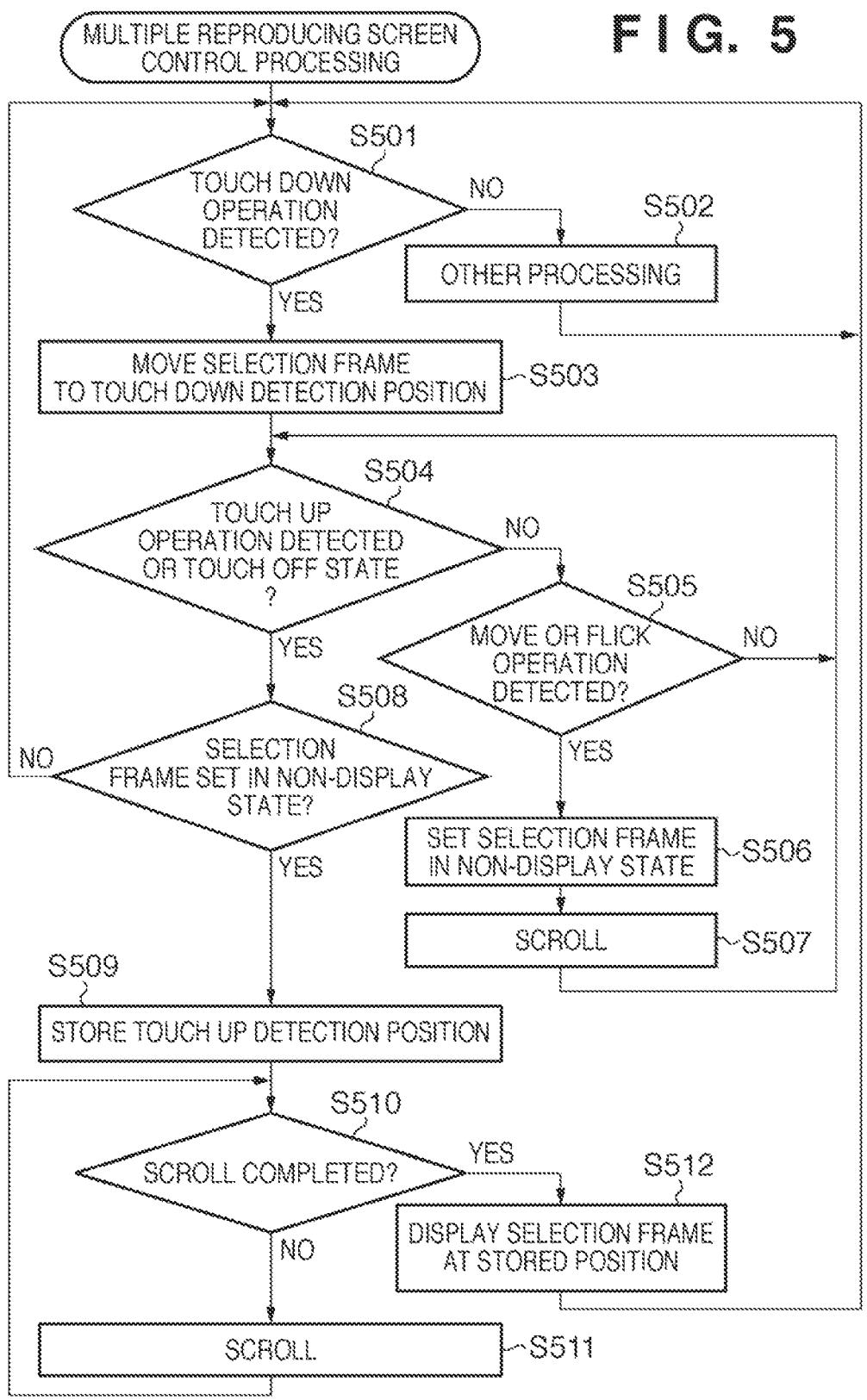

DISPLAY CONTROL APPARATUS, DISPLAY CONTROL METHOD, AND NON-TRANSITORY COMPUTER READABLE STORAGE MEDIUM

BACKGROUND OF THE INVENTION

1. Field of the Invention

The present invention relates to a technique of simultaneously displaying a plurality of display items.

2. Description of the Related Art

The recent growth in capacity of recording media allows an image capturing apparatus such as a digital camera to store an enormous number of captured images in a connected recording medium. The functions of browsing captured images on the display device of the image capturing apparatus include a multiple reproducing function of simultaneously displaying the thumbnails of a plurality of images as well as a normal reproducing function of reproducing and displaying images one by one. The multiple reproducing function has the advantage of improving image search performance and browsing performance, and enables the user to select a desired one of a plurality of images under browsing and process it. In the multiple reproducing function, generally, a selection frame (highlight indicating a selected state) is superimposed on an image to select it, and the user selects an image by operating to move the selection frame.

For the multiple reproducing function, a technique disclosed in Japanese Patent Laid-Open No. 11-317930 is known which, when the number of images recorded in a recording medium is larger than the number of images displayable by the multiple reproducing function, divides the images to be displayed into a plurality of pages, and switches the page at the time of browsing to allow the user to browse all images.

However, when page switching is performed at the time of browsing in the multiple reproducing function, as in Japanese Patent Laid-Open No. 11-317930, the image selected before page switching may be absent or displayed at a different position on the page after the switching. Since the selection frame display position after the page switching is different from that before, the user may lose track of the selection frame, resulting in difficulty in operating immediately.

SUMMARY OF THE INVENTION

The present invention has been made in consideration of the problem of the prior art. The present invention provides improving the operability when simultaneously displaying a plurality of display items.

The present invention in its first aspect provides a display control apparatus comprising: a selection unit configured to select at least one display item from a plurality of display items displayed on a display device; a display control unit configured to control to display, for the at least one display item selected by the selection unit from the plurality of display items displayed on the display device, an indication representing that the at least one display item is selected; a change unit configured to change the plurality of display items displayed on the display device to a plurality of other display items at least partially different from the plurality of display items; a storage unit configured to store a position on a display screen set before the change by the change unit; and a control unit configured to, after the change by the change unit, control the selection unit to select a display item displayed at the position set on the display screen before the change and stored in the storage unit.

Further features of the present invention will become apparent from the following description of exemplary embodiments (with reference to the attached drawings).

BRIEF DESCRIPTION OF THE DRAWINGS

FIGS. 4A, 4B, 4C, and 4D are views for explaining page scroll of a multiple reproducing screen according to the second embodiment; and FIG. 5 is a flowchart of multiple reproducing screen control processing according to the second embodiment.

DESCRIPTION OF THE EMBODIMENTS (First Embodiment)

An embodiment of the present invention will now be described in detail with reference to the accompanying drawings. Note that in the following embodiment, an example will be explained in which the present invention is applied to a personal computer (PC) that is an example of a display control apparatus capable of displaying a plurality of thumbnails in the display region of a connected display. However, the present invention is applicable to an arbitrary device capable of displaying a plurality of display items such as texts or moving images in the display region of a display apparatus. In this specification, "multiple reproducing" indicates a display form that lays out and displays a plurality of images in the display region of a display. The combination of the plurality of images to be displayed can be changed by a user's page scroll operation. In the embodiment to be described below, a selected image is displayed identifiably for the user by superimposing a "selection frame" on the image. However, the present invention is not limited to the selection frame superimposition, and any other display method of identifiably displaying a selected display item and non-selected display items (for example, reversed display) is usable.

Figure 1:
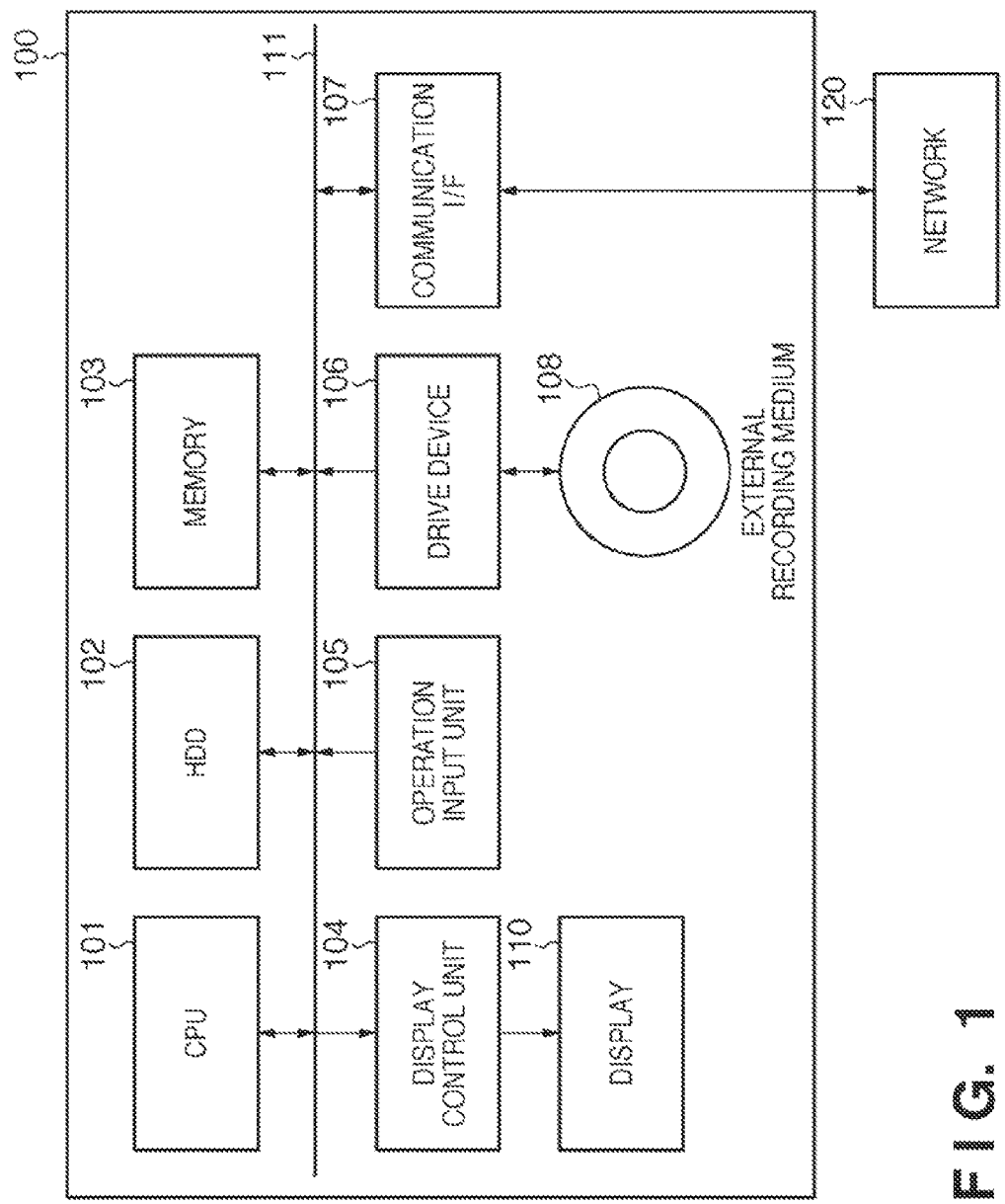
FIG. 1 is a block diagram showing the functional arrangement of a PC according to an embodiment.

FIG. 1 is a block diagram showing the functional arrangement of a PC according to an embodiment of the present invention.

A CPU 101 is a control device provided in the PC 100. The CPU 101 expands on a memory 103 (to be described later), the operation programs of the blocks of the PC 100 stored in a non-volatile memory (not shown) or an HDD 102, and executes them to control the operations of the blocks of the PC 100. The HDD 102 is a recording medium such as a hard disk connected to the PC 100 and, in this embodiment, records image data, data of an image browsing application, and the like in addition to the operation programs of the blocks of the PC 100. The memory 103 is a rewritable volatile memory provided in the PC 100 and serves as the work memory of the operation programs of the blocks of the PC 100 or a temporary storage area for storing setting information and parameter information of applications.

A display control unit 104 includes a GPU for controlling display of a connected display 110. The display control unit 104 generates a display control signal for display on the display 110 based on information of display contents input from the CPU 101, and sends it to the display 110. When the CPU 101 acquires GUI data to be displayed on the display 110 from, for example, a non-volatile memory and sends it to the display control unit 104, the display control unit 104 can control to display the fixed GUI data on the display 110. Note that the display 110 is a display apparatus such as an LCD, and may be a display apparatus incorporated in the PC 100 or an external display apparatus connected to the PC 100. An operation input unit 105 is an input interface that accepts user inputs to the PC 100. The operation input unit 105 identifies operation contents input using a connected mouse or keyboard and sends the information of the input operation to the CPU 101.

A drive device 106 is an interface configured to read out data recorded in an external recording medium 108 such as a CD-ROM or DVD-ROM or write data in the external recording medium 108. Note that the external recording medium 108 is not limited to the above-described CD-ROM or DVD-ROM and may be a memory card, non-volatile semiconductor memory, or the like. A communication interface (I/F) 107 is an interface configured to connect the PC 100 to an external network 120 such as a LAN or Internet. The communication I/F 107 can communicate with a device on the network 120 under the control of the CPU 101. Note that in this embodiment, a multiple reproducing method of displaying images stored in the HDD 102 on the display 110 will be described for the sake of simplicity. However, images to be displayed may be acquired from the drive device 106 or a device on the network 120.

The above-described CPU 101, HDD 102, memory 103, display control unit 104, operation input unit 105, drive device 106, and communication I/F 107 can communicate with each other via an internal bus 111.

The outline of an operation according to the embodiment of the present invention will be described next with reference to FIGS. 2A and 2B.

Figure 2A:
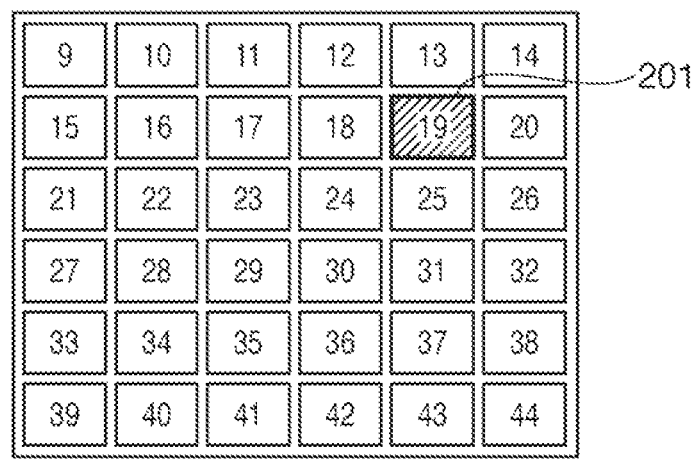
FIGS. 2A and 2B are views for explaining page switching of a multiple reproducing screen according to the first embodiment.
Figure 2B:
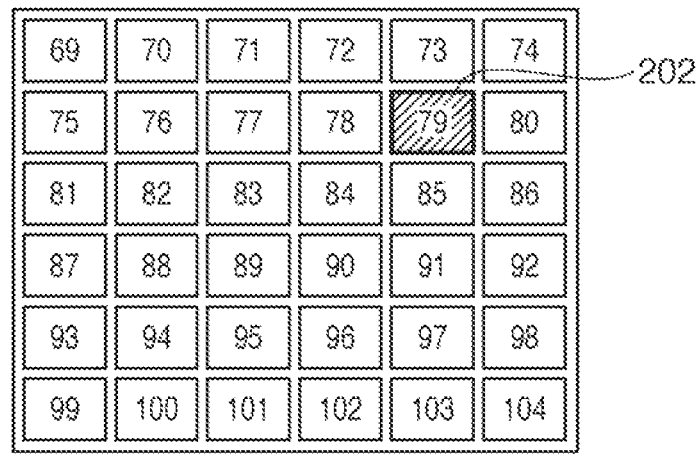

FIGS. 2A and 2B are views for explaining display in the display region of the display 110 in the multiple reproducing mode. The thumbnails of a plurality of images out of images stored in the HDD 102 are parallelly displayed in grid. The thumbnails of the plurality of images are displayed to be selectable. When the user selects an image 201 using a pointing device such as a mouse, the operation input unit 105 sends the point input position on the display region to the CPU 101. The CPU 101 causes the display control unit 104 to superimpose the selection frame on the display image 201 corresponding to the point input position so that the display image 201 becomes identifiable.

When a page switching operation request is input by a user operation in this state, the CPU 101 causes the memory 103 to store the information of the display position of the currently selected display image 201. The CPU 101 places focus on an image 202 that exists on the changed page at the same position as the display position of the image 201 stored in the memory 103, and causes the display control unit 104 to superimpose the selection frame. Note that in the page switching operation, when defining the combination of a plurality of images displayed in the display region as one page, the display is switched to a page corresponding to another combination of a plurality of images that are not displayed in the display region. Note that in this embodiment, all images displayed in the display region are changed by the page switching operation. However, the present invention is not limited to this, and is applicable to a case wherein at least some images of the plurality of displayed images are changed.

(Multiple Reproducing Screen Control Processing)

Figure 3:
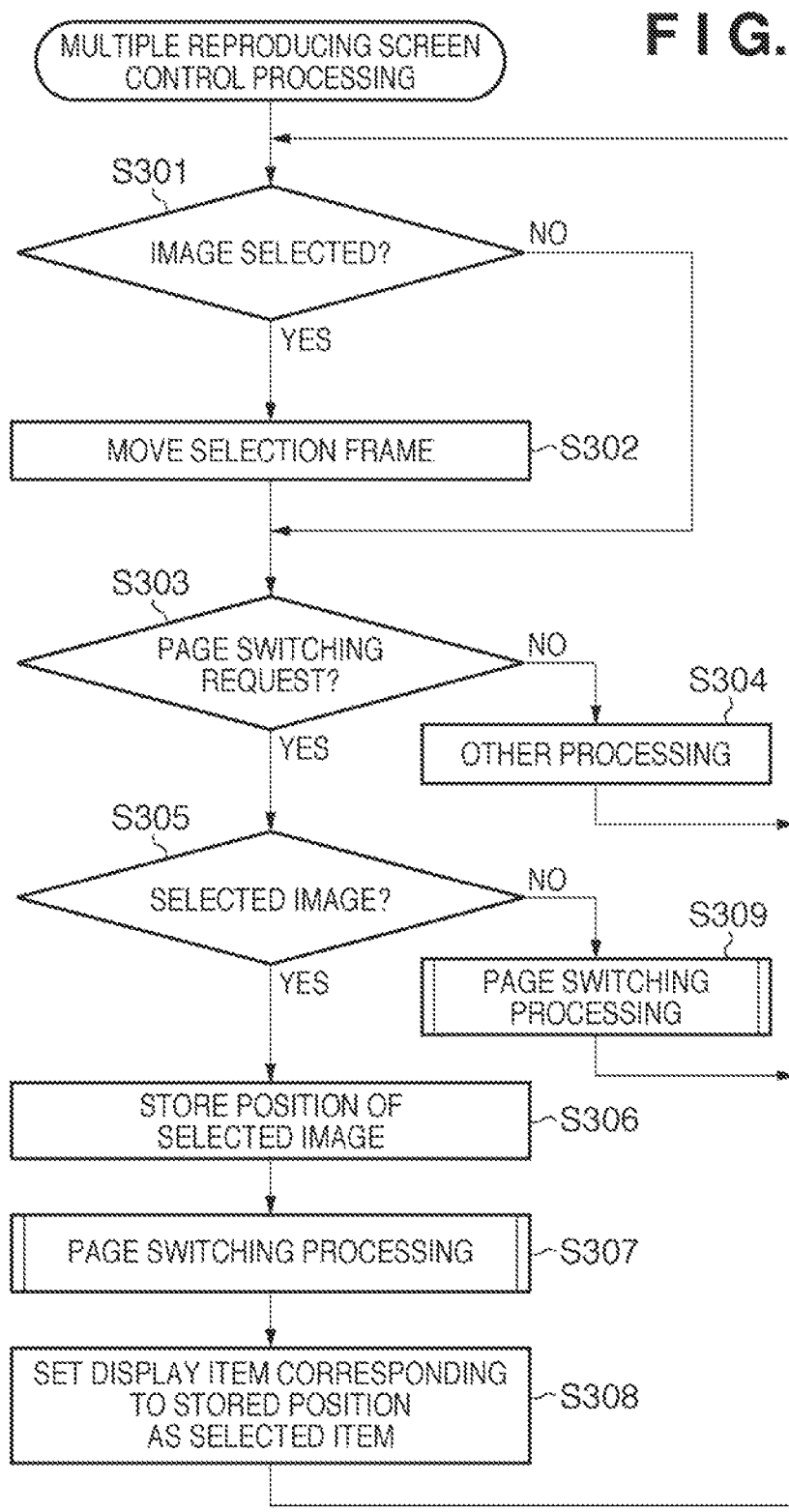
FIG. 3 is a flowchart of multiple reproducing screen control processing according to the first embodiment.

Multiple reproducing screen control processing of the PC 100 of the embodiment having the above-described arrangement will be described with reference to the flowchart of FIG. 3. Note that the multiple reproducing screen control processing starts when, for example, the user instructs to activate an image browsing application and sets multiple reproducing display as a display form for browsing on the application. Note that the multiple reproducing screen control processing will be explained below assuming that only one image is selected. However, a plurality of display items may be selected from displayed display items.

In step S301, the CPU 101 determines whether the user has performed the operation of selecting one of the plurality of images displayed in multiple reproducing display. More specifically, the CPU 101 determines whether a signal representing that the user has done image selection is input from the operation input unit 105, thereby determining whether an image is selected. Upon determining that an image is selected, the CPU 101 advances the process to step S302. Upon determining that no image is selected, the CPU 101 advances the process to step S303. Examples of the operation of selecting an image are a mouse click operation on an image and an operation of moving the selection frame from the current position to another adjacent position by pressing a direction key.

In step S302, the CPU 101 specifies the selected image displayed at the input position based on the information of the position on the display region of the display 110 where the input to select the image has been done in step S301. The CPU 101 then sends the GUI data of the selection frame stored in, for example, the HDD 102 to the display control unit 104, and causes it to superimpose the selection frame on the selected image.

In step S303, the CPU 101 determines whether the user has input the page switching operation request from the page currently displayed in multiple reproducing display to another page. More specifically, the CPU 101 determines whether a signal representing that the user has input the page switching operation request is input from the operation input unit 105, thereby determining whether the page switching operation request is input. Upon determining that no page switching operation request is input, the CPU 101 advances the process to step S304 to determine whether an input of another operation request is received from the operation input unit 105. If an operation request is received, the CPU 101 executes processing corresponding to the request, and returns the process to step S301.

Examples of the operation of inputting the page switching operation request are a page switching button press operation, an operation of instructing scroll by a button operation member, joystick, dial, or the like, and an operation of dragging a scroll bar using a pointing device such as a mouse.

Upon determining in step S303 that the page switching operation request is input, the CPU 101 advances the process to step S305 to determine whether there is an image selected by the user, that is, to determine whether an image with the selection frame superimposed on it exists among the plurality of displayed images. Upon determining that an image selected by the user exists among the plurality of displayed images, the CPU 101 advances the process to step S306.

In step S306, the CPU 101 acquires the information of the display position of the image selected by the user out of the plurality of images displayed before the page switching operation, and stores the information in the memory 103. For example, when the plurality of images are displayed in grid, as shown in FIGS. 2A and 2B, the information of the display position of the selected image may include the ordinal positions of the row and column counted from the image displayed at the upper left corner of the display region.

In step S307, the CPU 101 performs page switching processing. The CPU 101 reads out, from the HDD 102, information of the thumbnails of images to be displayed on the display 110 after the page switching operation, and sends the information to the display control unit 104 to display the images on the display 110. As the page switching processing, the same processing as the above-described page switching processing is performed, and a description thereof will not be repeated in this embodiment.

In step S308, the CPU 101 acquires the information of the display position of the image selected before the page switching operation, which is stored in the memory 103 in step S306. The CPU 101 sets, as the selection frame display target image, one of the plurality of images displayed on the display 110 after the page switching operation at the display position of the image selected before the page switching operation. The CPU 101 sends the GUI data of the selection frame stored in the HDD 102 to the display control unit 104, causes it to superimpose the selection frame on the image displayed on the display 110 and set as the selection frame display target image, and returns the process to step S301.

Note that upon determining in step S305 that there is no image selected by the user, the CPU 101 advances the process to step S309 to execute page switching processing, and then returns the process to step S301.

As described above, when a plurality of display items are simultaneously displayed, and display items to be displayed are changed, the display control apparatus of this embodiment can place focus on a display item displayed after the change at the same position as that of a display item focused before the change. More specifically, to change the display from a plurality of displayed display items to a plurality of other display items that are at least partially different, the display control apparatus performs the following processing. At least one display item selected from the plurality of displayed display items is displayed identifiably, and the display position of the selected display item is stored. After the plurality of displayed display items have been changed to a plurality of other display items, a display item displayed at the same position as the stored display position of the display item selected before the change is identifiably displayed.

When the plurality of displayed display items have been changed, focus can be placed on the display item displayed at the same position as that of the display item focused before the change. The user can therefore identify the focus even after switching the display. That is, even after switching the display, the user can easily recognize where the information for identifying the selected display item exists in the display region.

(Second Embodiment)

In the first embodiment, realizing the present invention using a pointing device such as a mouse has been described. In the second embodiment, a PC 100 with the arrangement of the first embodiment includes a touch panel display serving as a display 110. An operation input unit 105 detects, using a touch panel sensor, information of a position on the display region where the user has done touch input using a finger or a pen.

The terms of various states (operations) recognized on the touch panel display, which are used in the description of this specification, will be described below.

Touch down: state of the instant a touch input is recognized

Touch on: state wherein a touch input is being recognized

Move: state wherein after touch on, the input point is moving by a predetermined distance or more (for example, drag)

Touch up: state of the instant the input is determined to be interrupted because the input point is not recognized for a predetermined time or more Flick: state wherein touch up is done immediately after move at a predetermined speed or more (for example, fillip)

Touch off: state in which no touch input is being done

Note that though multiple reproducing screen control processing of this embodiment will be described below using the above-described six states, the terms of states and setting a state that triggers a process are merely examples and are not limited to those to be described below.

The outline of an operation according to the embodiment of the present invention will be described next with reference to FIGS. 4A, 4B, 4C, and 4D.

Figures 4A, 4B:
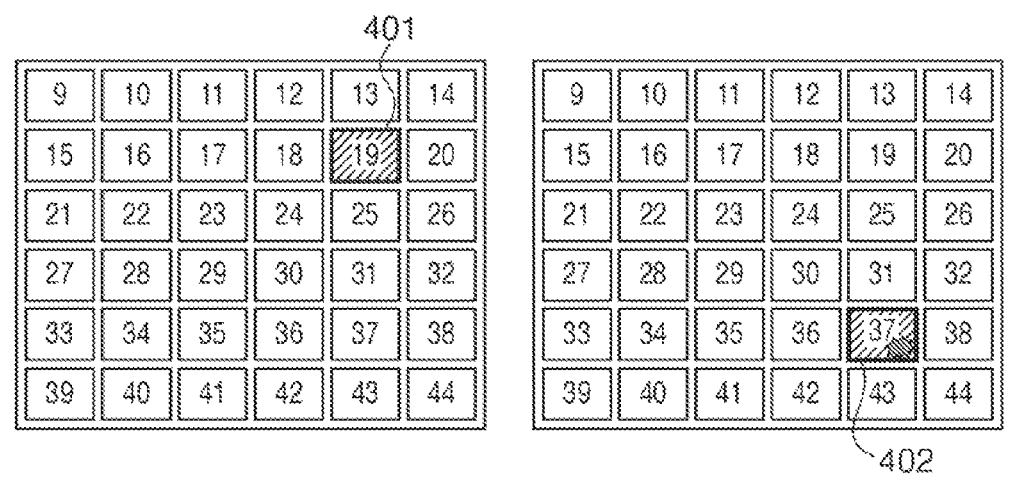
Figure 4C:
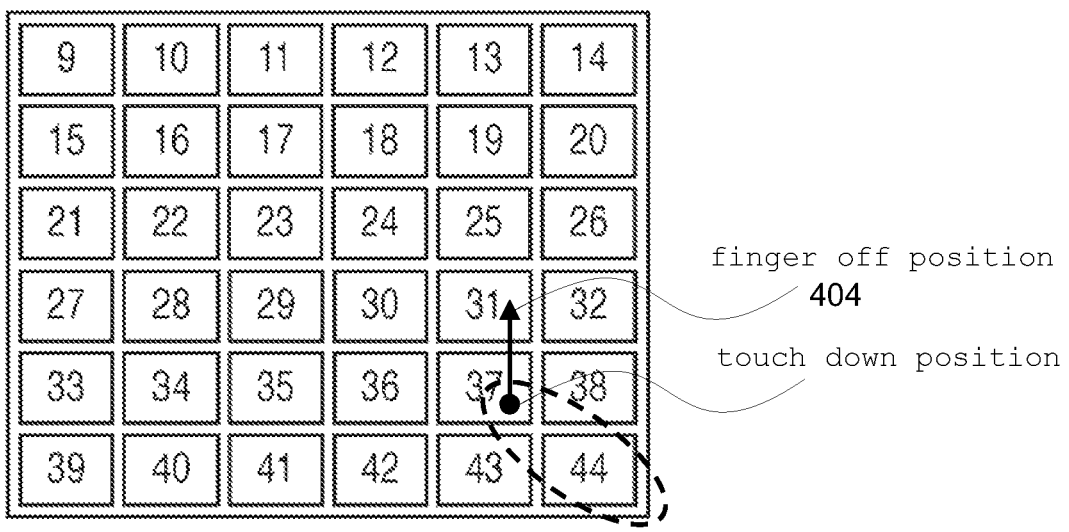
Figure 4D:
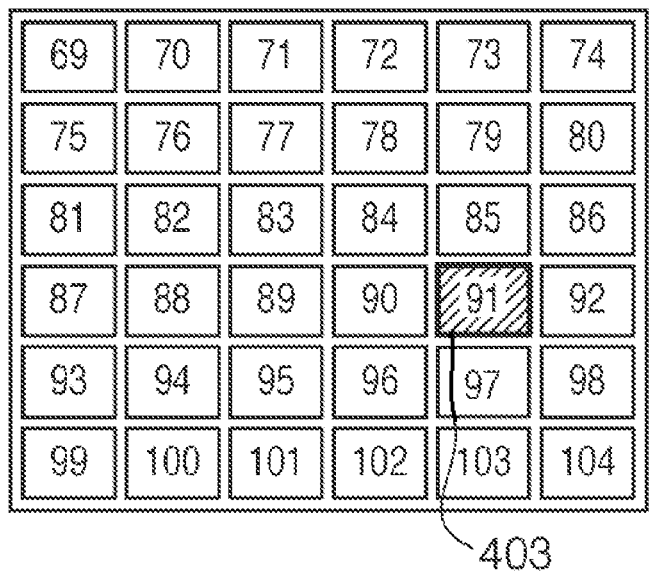

FIGS. 4A, 4B, 4C, and 4D are views illustrating display in the display region of the display 110 in the multiple reproducing mode, like FIGS. 2A and 2B. The thumbnails of a plurality of images out of images stored in an HDD 102 are parallelly displayed in grid. As shown in FIG. 4A, the thumbnails of the plurality of images are displayed to be selectable. When the user performs touch input in a state wherein an image 401 is selected, the operation input unit 105 sends the touch down position on the display region to a CPU 101. The CPU 101 causes a display control unit 104 to superimpose the selection frame on a display image 402 displayed at the touch down position, as shown in FIG. 4B, so that the image 402 becomes identifiable.

When the user performs the flick operation upward, as shown in FIG. 4C, in this state, the CPU 101 determines that the user has input a page scroll operation request. At this time, the CPU 101 causes a memory 103 to store the information of the display position of the image corresponding to the position 404 determined as the point where the user has performed the flick operation and moved the finger off the touch panel sensor of the display 110. The CPU 101 places focus on an image 403 (see FIG. 4D) that exists on the scrolled page at the same position as the display position of the image corresponding to the finger off position 404 on the touch panel sensor (see FIG. 4C) stored in the memory 103. The CPU 101 also causes the display control unit 104 to superimpose the selection frame. Note that in the page scroll operation, defining the combination of a plurality of images displayed in the display region as one page, display is changed to the combination of a plurality of other images in which at least some of the plurality of displayed images are changed.

(Multiple Reproducing Screen Control Processing)

Multiple reproducing screen control processing of the PC 100 of the embodiment having the above-described arrangement will be described with reference to the flowchart of FIG. 5. Note that the multiple reproducing screen control processing starts when, for example, the user instructs to activate an image browsing application and sets multiple reproducing display as a display form for browsing on the application. Note that the multiple reproducing screen control processing will be explained below assuming that only one image is selected. However, a plurality of display items may be selected from displayed display items.

In step S501, the CPU 101 determines whether the user has performed the operation of selecting one of the plurality of images displayed in multiple reproducing display. More specifically, the CPU 101 acquires, from the operation input unit 105, information representing that the user has done touch input and information of the input position on the display region. If a selectable image is displayed at the input position, the CPU 101 determines that the image is selected. Upon determining that no image is selected, the CPU 101 advances the process to step S502 to determine whether an input of another operation request is received from the operation input unit 105. If an operation request is received, the CPU 101 executes processing corresponding to the request, and returns the process to step S501. Upon determining that an image is selected, the CPU 101 advances the process to step S503. Note that the condition to determine that an image is selected is not limited to the condition that a selectable image is displayed at the position of a touch down input on the display region. For example, it may be determined that an image is selected when input is done in a predetermined region larger than the image display size around each selectable image.

In step S503, the CPU 101 specifies the image displayed at the position where the touch down input has been done in step S501 on the display region of the display 110. The CPU 101 then sends the GUI data of the selection frame stored in, for example, the HDD 102 to the display control unit 104, and causes it to superimpose the selection frame on the selected image.

In step S504, the CPU 101 determines whether the user has performed the touch up operation, or the touch off state is set. More specifically, upon acquiring, from the operation input unit 105, information representing detection of the touch up operation or information representing the touch off state, the CPU 101 determines that the touch up operation has been done and advances the process to step S508. If no information representing detection of the touch up operation is acquired from the operation input unit 105, the CPU 101 advances the process to step S505.

Note that upon detecting the touch up operation, the operation input unit 105 sends, to the CPU 101, the information of the position of the touch input point on the display region immediately before the touch up operation detection. The CPU 101 stores the received information of the detection position of the touch input point on the display region immediately before the touch up operation in the memory 103 as the touch up detection position.

In step S505, the CPU 101 determines whether the user has performed the move or flick operation. More specifically, upon acquiring, from the operation input unit 105, information representing detection of the move or flick operation, the CPU 101 advances the process to step S506. If no information is acquired, the CPU 101 returns the process to step S504. Note that in this embodiment, the move or flick operation is determined as a page scroll request operation. That is, the user can scroll the page by performing touch down input on the display 110 and then performing the move operation while keeping the touch on state. In addition, the user can freely scroll and move from the displayed page to an arbitrary page by performing touch down input on the display and then performing the flick operation while keeping the touch on state.

Note that upon detecting the flick operation, the operation input unit 105 sends, to the CPU 101, the information of the position where the touch input point has been detected on the display region finally in the flick operation. That is, the operation input unit 105 sends, to the CPU 101, the information of the position of the touch input point immediately before the touch up operation detection that leads to the flick operation determination. The CPU 101 stores the received information of the position where the touch input point has been detected on the display region finally in the flick operation in the memory 103 as the touch up detection position.

In step S506, the CPU 101 causes the display control unit 104 to set, in the non-display state, the selection frame superimposed on the selected image on the display 110 in step S503. In step S507, the CPU 101 performs page scroll processing based on the operation amount of the move or flick operation input in step S505. More specifically, the CPU 101 specifies, based on the acquired operation amount of the move or flick operation, a combination of images to be displayed, acquires the thumbnails of the images to be displayed out of the images stored in the HDD 102, and sends them to the display control unit 104 to cause it to display the images. At this time, the CPU 101 returns the process to step S504 without waiting for completion of the page scroll processing. Note that if the flick operation is detected in step S505, the touch up operation has already been detected, and therefore, the operation input unit 105 sends information representing the touch off state to the CPU 101 when the process has returned to step S504.

The CPU 101 determines in step S508 whether an image with the selection frame superimposed on it has existed in the display region of the display 110 upon determining that the user has performed the touch up operation, or the touch off state is set. That is, the CPU 101 determines whether the user has performed the move or flick operation, and the display control unit 104 has set the selection frame in the non-display state in step S506. If the selection frame is in the non-display state, the CPU 101 advances the process to step S509. If the selection frame is being displayed, the CPU 101 returns the process to step S501. When the selection frame is being displayed in step S508, it means that the finger has been moved off (touch up) without moving the touch input point after the touch down operation. This is the operation of performing only image selection.

In step S509, the CPU 101 reads out the information of the position where the touch input point has been detected finally on the display region upon detecting the touch up operation or the touch off state, which is stored in the memory 103. The CPU 101 specifies, in the display form to display images on the display 110, the information of the display position of the image corresponding to the position where the touch input point has been detected finally on the display region, and stores the position in the memory 103. The information of the display position of the image corresponding to the position where the touch input point has been detected finally on the display region may include, for example, the ordinal positions of the row and column counted from the image displayed at the upper left corner of the display region, as in the first embodiment.

In step S510, the CPU 101 determines whether the page scroll processing started in step S507 is completed. If the page scroll processing is not completed, the CPU 101 advances the process to step S511 to continue the page scroll processing, and then returns the process to step S510. If the page scroll processing is completed, the CPU 101 advances the process to step S512 to acquire the information of the display position of the image corresponding to the position where the touch input point has been detected finally on the display region, which is stored in the memory 103 in step S509. The CPU 101 sets, as the selection frame display target image, the image displayed on the display 110 after the page scroll processing at the display position of the image corresponding to the position where the touch input point has been detected finally on the display region. The CPU 101 sends the GUI data of the selection frame stored in the HDD 102 to the display control unit 104, and causes it to superimpose the selection frame on the image set as the selection frame display target image out of the plurality of images displayed on the display 110. After that, the CPU 101 returns the process to step S501.

In this embodiment, the method has been described which sets, as the selection frame display target image after the display items to be displayed have been changed, the image corresponding to the position where the touch input point has been detected finally on the display region, that is, the position where disappearance of the touch input has been detected. However, the image at the position where touch input has been detected, that is, the image selected first by the touch down operation may be set as the selection frame display target image after display items to be displayed have been changed, as in the first embodiment.

As described above, when a plurality of display items are simultaneously displayed, and the display items to be displayed are changed, the display control apparatus of this embodiment can place focus on a display item displayed after the change at the same position as that of a display item displayed at the position where the touch input has disappeared. More specifically, to change display from a plurality of displayed display items to a plurality of other display items that are at least partially different, the display control apparatus performs the following processing. At least one display item selected from the plurality of displayed display items is displayed identifiably. When changing the plurality of displayed display items to the plurality of other display items by the user's touch input operation, the position where disappearance of the touch input has been detected is stored. After the plurality of displayed display items have been changed to the plurality of other display items, out of the plurality of other displayed display items, a display item displayed at the same position as the stored position where disappearance of the touch input has been detected is identifiably displayed.

When the plurality of displayed display items have been changed, focus can be placed, after the change, on the display item displayed at the same position as the position where touch input for the change has been done. The user can therefore identify the focus even after switching the display. That is, even after switching the display, the user can easily recognize where the information for identifying the selected display item exists in the display region.

Note that the control of the PC 100 according to the first and second embodiments may be done by either one piece of hardware or a plurality of pieces of hardware to control the entire apparatus.

The present invention has been described in detail based on the preferred embodiments. However, the present invention is not limited to these specific embodiments and incorporates various forms within the spirit and scope of the present invention. The above-described embodiments are merely examples of the present invention and can be combined as needed.

In the above-described embodiments, the present invention is applied to a PC. However, practicing the present invention is not limited to the above-described example. More specifically, the present invention is applicable to a display control apparatus such as a digital camera, PDA, cellular phone terminal, portable image viewer, a display provided in a printing apparatus to select and check printed images, or a digital photo frame able to simultaneously display a plurality of images.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-020743, filed Feb. 1, 2010, which is hereby incorporated by reference herein in its entirety.

What is claimed is:

1. A display control apparatus comprising:
   a detector that detects a touch operation on a display unit;
   a selector that selects one or more first selected display items from a plurality of display items displayed on said display unit;
   a display controller that controls to display, for the one or more first selected display items selected by said selector from the plurality of display items displayed on said display unit, an indication representing that the one or more first selected display items are selected;
   a changer that changes the plurality of display items displayed on said display unit to a plurality of other display items at least partially different from the plurality of display items in response to a move operation that a position, where the touch operation has been done, moves, detected by said detector; and
   a controller that controls, after the change by said changer, said selector to select one or more second selected display items which are displayed at a position where the touch operation, which became a factor for the change, is no longer done,
   wherein each of the one or more second selected display items are different from each of the one or more first selected display items.

2. The apparatus according to claim 1, wherein, after the change by said changer, said controller controls said selector to select, regardless of a position where the display item selected before the change was displayed, the display item which is displayed at the position where the touch operation for the change is no longer done.

3. The apparatus according to claim 1, further comprising a storage unit that stores, after the move operation, information relevant to the position where the touch operation for the move operation is no longer done,
   wherein, after the change by said changer, said controller controls said selector to select the display item based on the information stored by said storage unit.

4. The apparatus according to claim 1, wherein said selector selects the display item based on the touch operation detected by said detector.

5. The apparatus according to claim 4, wherein said selector selects, in response to start of the touch operation to said display unit, the display item displayed at the position where the touch operation is started.

6. The apparatus according to claim 1, wherein the display item is an image.

7. The apparatus according to claim 1, wherein said changer performs the change in response that the position detected by said detector, where the touch operation has been done, moves by not less than a predetermined distance.

8. The apparatus according to claim 3, wherein said storage unit stores, as the position where the touch operation for the move operation is no longer done, a position finally detected said detector where the touch operation has been done.

9. The apparatus according to claim 1, wherein when the change by said changer starts, said display controller controls not to display the indication.

10. The apparatus according to claim 1, wherein the change by said changer is done by a scroll operation of the plurality of displayed display items.

11. The apparatus according to claim 1, wherein the change by said changer is done by a page switching operation.

12. A non-transitory computer readable storage medium recording a program which causes a computer to function as each unit of a display control apparatus of claim 1.

13. The apparatus according to claim 1, wherein the plurality of other display items are completely different from the plurality of display items.

14. A display control method comprising:
- a step of detecting a touch operation on a display unit;
- a first selection step of selecting one or more first selected display items from a plurality of display items displayed on said display unit;
- a display control step of controlling to display, for the one or more first selected display items selected by said selection step from the plurality of display items displayed on said display unit, an indication representing that the one or more first selected display items are selected;
- a change step of changing the plurality of display items displayed on said display unit to a plurality of other display items at least partially different from the plurality of display items in response to a move operation that a position, where the touch operation has been done, moves, detected by said detection step; and
- a second selection step of selecting, after the change by said change step, one or more second selected display items which are displayed at a position where the touch operation, which became a factor for the change, is no longer done, wherein each of the one or more second selected display items are different from each of the one or more first selected display items.

* * * * *